United States Patent [19]
Totten et al.

[11] Patent Number: 5,851,960
[45] Date of Patent: Dec. 22, 1998

[54] METHOD OF PERFORMING WELL DRILLING OPERATIONS WITH A FOAMABLE DRILLING FLUID

[75] Inventors: Patty L. Totten; Bobby L. King; James E. Griffith, all of Duncan, Okla.

[73] Assignee: Halliburton Company, Duncan, Okla.

[21] Appl. No.: 957,268

[22] Filed: Oct. 23, 1997

Related U.S. Application Data

[62] Division of Ser. No. 525,885, Sep. 8, 1995, Pat. No. 5,716,910.

[51] Int. Cl.$^6$ .............................. C09K 7/00; E21B 21/14
[52] U.S. Cl. ......................... 507/118; 507/102; 507/121; 507/135; 507/136; 175/69
[58] Field of Search ................................... 507/102, 121, 507/118, 135, 136; 175/69

[56] References Cited

U.S. PATENT DOCUMENTS

| | | | |
|---|---|---|---|
| 4,121,674 | 10/1978 | Fischer et al. | 175/66 |
| 4,201,678 | 5/1980 | Pye et al. | 252/8.5 A |
| 4,457,375 | 7/1984 | Cummins | 166/309 |
| 4,524,002 | 6/1985 | Hashem | 252/8.5 C |
| 4,681,164 | 7/1987 | Stacks | 166/309 |
| 5,049,311 | 9/1991 | Rasheed et al. | 252/389.52 |
| 5,113,943 | 5/1992 | Wilson et al. | 166/291 |
| 5,213,160 | 5/1993 | Nahm et al. | 166/293 |
| 5,213,161 | 5/1993 | King et al. | 166/293 |
| 5,221,489 | 6/1993 | Bloys et al. | 252/8.551 |
| 5,284,207 | 2/1994 | Bittleston et al. | 166/291 |
| 5,316,083 | 5/1994 | Nahm et al. | 166/291 |
| 5,385,206 | 1/1995 | Thomas | 166/269 |
| 5,513,712 | 5/1996 | Sydansk | 175/69 |

*Primary Examiner*—C. H. Kelly
*Attorney, Agent, or Firm*—Craig W. Roddy

[57] ABSTRACT

A foamable drilling fluid for use in well operations such as deep water offshore drilling where risers are not employed in returning the fluid to the surface mud pit. A preferred foamable drilling fluid comprises a prehydrated clay such as bentonite, sea water, a surfactant selected from the group consisting of α-olefinsulfonates, alkylpolyglycosides, alcohol sulfates, salts of ethoxylated alcohol sulfates, and a stabilizing surfactant consisting of cocoamine betaine. The stabilized foam drilling fluid resists foam breakdown upon drilling cessation, prevents fluid loss to reduce filter cake buildup and increases the carrying capacity of cuttings and other solids. In addition, a foamable drilling fluid is provided including an hydraulic material selected from the group consisting of Portland cement, siliceous material like fumed silica, blast furnace slag and pozzolans such as fly ash. The hydraulic material solidifies the filter cake, reduces the filter cake permeability, and provide better bonding between the filter cake and cement slurry.

34 Claims, No Drawings

METHOD OF PERFORMING WELL DRILLING OPERATIONS WITH A FOAMABLE DRILLING FLUID

This is a divisional of application Ser. No. 08/525,885 filed on Sep. 8, 1995 now U.S. Pat. No. 5,716,910.

BACKGROUND OF THE INVENTION

1. Field of the Invention

The present invention relates generally to a drilling fluid, and more particularly, to a foamable drilling fluid for use in well operations such as deep water offshore drilling.

2. Description of the Prior Art

A variety of fluids are known for use in drilling wellbores. Conventionally, a wellbore is drilled using a drilling fluid that is circulated through the wellbore; after the wellbore is drilled, the circulation of the drilling fluid is stopped, the well is logged and a string of pipe is run in the wellbore. After the pipe is run, the drilling fluid in the wellbore is cleaned up by circulating drilling fluid downwardly through the interior of the pipe and upwardly through the annulus between the exterior of the pipe and the walls of the wellbore while removing drilling solids and gas therefrom. Primary cementing operations are then performed in the wellbore, i.e., the string of pipe disposed in the wellbore is cemented therein by placing a cementing composition in the annulus between the pipe and the walls of the wellbore.

Single phase (liquid only) water based drilling fluids are commonly used in both onshore and offshore operations wherein two phase (liquid and gas) often referred to as foamed drilling fluids are typically used only in onshore drilling operations. Conventional offshore drilling fluids consist of sea water as the base fluid and are circulated from the well annulus to the sea floor.

Offshore well completions at depths in excess of 2000 feet of water are often referred to as "deep water" operations. In certain deep water operations, such as in the Gulf of Mexico, the formations where conductor pipe is cemented that is less than 2000 feet below mud line (BML) are generally young geologically and are not well consolidated. The formations generally are the product of erosion from the continental shelf. This can cause numerous problems in cementing the casing in the wellbore.

Some standard offshore drilling operations for drilling the conductor casing intervals do not utilize a riser for returning the drilling fluid to the surface mud pit wherefore acceptable drilling fluids must be environmentally safe for return to the sea floor. As a result, most offshore drilling fluids consist essentially of sea water.

Numerous offshore drilling problems result from not having a riser to return drilling fluids to the mud pit and from using primarily sea water as the drilling fluid. Importantly, the use of sea water alone provides little or no fluid loss control, and the use of fluid loss additives therewith is uneconomical because risers are not used and the drilling fluid is lost when circulated to the sea floor. Fluid loss from a sea water based drilling fluid allows the cuttings and particulates circulated during drilling to form the basis of a thick mud filter cake build up in the annulus, which compromises the long term integrity of the cement job because filter cake buildup against the formation face provides a pathway for undesired water or sand flow.

Hence, numerous advantages are gained when a stable two phase (liquid and gas) foamed drilling fluid is used in offshore drilling operations. The stable foamed drilling fluid, which consists of system analogous to an emulsion with gas as the internal phase and liquid as the external phase, has low fluid loss which results in less filter cake buildup in the annulus of the well and a better cement job. The foaming action imparts greater volume to the starting fluid volume. Larger fluid volumes improve cuttings removal because the concentration of cuttings in the mud often reaches a saturation point in these drilling operations. At the saturation point, the only way to remove additional cuttings from the well is to increase the fluid volume pumped. The viscosity of the foamed drilling fluid allows effective lifting of relatively large particles having a diameter of several inches. This characteristic of a foamed fluid is particularly important in a large annulus where any fluid encounters reduced velocity and thereby reduced cuttings carry-capacity. Density of the foamed fluid is easily adjusted through control of the amount of gas used in foaming the fluid thereby increasing the operational ease of handling. Decreased leak-off from the foamed fluid results in less clay swelling thus reducing the chances of having washed out portions in the wellbore. Also, the foamed fluid has a lower hydrostatic pressure which reduces the chance of fracturing the formation when low fracture gradients are present in the wellbore.

Known foam drilling fluids are used in conjunction with risers or the like for returning the fluid to the rig floor. Hence, the foam fluids are unstable and breakdown when the drilling action ceases or the fluids are returned such that the cuttings are easily separated from the returns and the fluid can be recirculated into the well. Additionally, the unstable foamed fluid will release suspended cuttings and allow them to return downhole if the drilling action ceases while the fluid is in the wellbore.

As provided by the present invention, a stable foamed fluid does not breakdown and return cuttings downhole if the drilling action ceases, which is especially desirable in wellbores having a large annulus. To date, no stable foamed fluids have been used in operations having risers because the volume of the returns would be unmanageable without foam breakdown. Hence, in well operations without risers, it is desirable to provide a stabilized foam drilling fluid which is environmentally safe since returns are circulated to the sea floor.

Furthermore, it is desirable to have a foamed drilling fluid which includes hydraulic materials to setup the filter cake and by-passed mud thereby preventing many of the problems presented herein. The hydraulic material solidifies the filter cake, reduces the filter cake permeability, and provides better bonding with conventional cement slurries. Nevertheless, until now, no foamed drilling fluid containing an hydraulic material has been provided.

By the present invention a stable and environmentally safe foamable drilling fluid is provided. In addition, a foamable drilling fluid having an hydraulic material, such as Portland cement, siliceous material like fumed silica, blast furnace slag or pozzolans such as fly ash is provided.

SUMMARY OF THE INVENTION

Wellbores are commonly drilled using a rotary bit connected to a string of drill pipe. The drill pipe and bit are rotated and a drilling fluid is circulated downwardly through the drill pipe, through ports in the drill bit and then upwardly through the annulus between the drill pipe and the walls of the wellbore to the surface. The drilling fluid transports cuttings produced by the drill bit to the surface.

The present invention provides a stable and environmentally safe foamed drilling fluid for use in offshore drilling operations where the foamed fluid is circulated to the sea floor. As such, a preferred foamable drilling fluid comprises a starting fluid made from a clay such as bentonite, attapulgite or sepiolite and is prehydrated with fresh water, sea water, or common salt solutions. Further, the preferred foamable drilling fluid includes sea water, a foaming surfactant for foaming the fluid and a stabilizing surfactant for stabilizing the foamed fluid. The foaming surfactant is selected from the group consisting of α-olefinsulfonates, alkylpolyglycosides, alcohol sulfates or salts of ethoxylated alcohol sulfates. A sufficient amount of stabilizing surfactant, such as cocoamine betaine, is used in the fluid for reducing foam breakdown upon drilling cessation, reducing filter cake buildup and increasing the carrying capacity of cuttings and other solids.

In addition, a foamable drilling fluid is provided which includes an hydraulic material selected from the group consisting of Portland cement, siliceous material like fumed silica, blast furnace slag and pozzolans such as fly ash. The hydraulic material solidifies the filter cake and any bypassed mud, reduces the filter cake permeability, and provides better bonding with conventional cement slurries.

It is, therefore, a general object of the present invention to provide a stabilized foamed drilling fluid composition.

A further object of the present invention is to provide a foamable drilling fluid composition and method for use in deep water offshore drilling operations.

A further object of the present invention is the present invention to provide a foamable drilling fluid containing an hydraulic material.

Yet, a further object of the present invention is to provide a foamable drilling fluid which is environmentally safe.

Other and further objects, features and advantages of the present invention will be readily apparent to those skilled in the art upon a reading of the description of preferred embodiments which follows.

DESCRIPTION OF PREFERRED EMBODIMENTS

As mentioned above, the foam drilling fluid composition and methods of the present invention are for use in well drilling operations, and particularly in deep water offshore drilling where a riser is not being utilized. The present invention provides a stable and environmentally safe foamable drilling fluid composition and methods of use therefor. Additionally, the present invention provides a foamable drilling fluid including an hydraulic material.

A preferred starting fluid comprises a clay such as bentonite, attapulgite or sepiolite which is prehydrated in fresh water, sea water, or salt solution to form a slurry. Water, preferably sea water, brine or other common salt solution, is added to the starting fluid in the range from about 0 bbl to about 2 bbl per bbl of starting fluid slurry. A foaming surfactant for use in foaming the drilling fluid is selected from the group consisting of α-olefinsulfonates, alkylpolyglycosides, alcohol sulfates, and salts of ethoxylated alcohol sulfates.

A preferred foaming agent which can be used is a sodium salt of alpha-olefinic sulfonic acid (AOS) which is a mixture of compounds of the formulas:

$$X[H(CH_2)_n-C=C-(CH_2)_mSO_3Na]$$

and $$Y[H(CH_2)_p-COH-(CH_2)_qSO_3Na]$$

wherein:

n and m are individually integers in the range of from about 6 to about 16;

p and q are individually integers in the range of from about 7 to about 17; and

X and Y are fractions with the sum of X and Y being 1. This foaming agent is available from Halliburton Energy Services under the trade name "AQF-2™."

Another particularly preferred foaming agent is a surfactant having the formula:

$$H(CH_2)_a(OC_2H_4)_3OSO_3Na$$

wherein:

a is an integer in the range of from about 6 to about 10. This surfactant is commercially available from Halliburton Energy Services of Duncan, Okla., under the trade designation "CFA-S™."

Another available foaming agent is comprised of an oxyalkylatedsulfonate, and is referred to by Halliburton Energy Services, Duncan, Okla. under the trade designation "FDP-C485."

Still another surfactant which can be used is an alcohol ether sulfate of the formula:

$$H(CH_2)_a(OC_2H_4)_bSO_3NH_4^+$$

wherein:

a is an integer in the range of from about 6 to about 10; and b is an integer in the range of from about 3 to about 10. This foaming agent is available from Halliburton Energy Services under the trade designation "HOWCO-SUDS™".

Another suitable foaming agent is comprised of alkylpolysaccharides and is commercially available from Seppic, Inc. of Fairfield, N.J. under the trade designation "SIMUSOL-10." The foaming surfactant concentration is provided in the range from about 1% to about 4% by volume of water (BVOW).

The preferred stabilizing surfactant consists of cocoamine betaine and is available under the tradename "HC-2" from Halliburton Energy Services of Duncan, Okla. The stabilizing surfactant concentration is provided in the range from about 0.5% to about 2% BVOW. A sufficient amount of stabilizing surfactant is used for stabilizing the foamed drilling fluid (i.e. the foamed drilling fluid will not significantly breakdown in the wellbore upon drilling cessation).

Barite may be added to the drilling fluid composition as a weighting material for achieving a desired drilling fluid density. In addition, an hydraulic material may be added to the composition wherein the hydraulic material is selected from a group consisting of Portland cement, siliceous material like fumed silica, blast furnace slag and pozzolans such as fly ash. The barite and/or hydraulic material are added in the drilling fluid in an amount necessary for achieving a desired density of the unfoamed drilling fluid composition. The density of the unfoamed drilling fluid composition can range from about 9 to about 17 lbs/gal, while the density of the foamed drilling fluid composition is in the range from about 6 to about 13 lbs/gal. The preferred density of the unfoamed drilling fluid is in the range of about 13 lb/gal to about 15 lb/gal, while the preferred foamed drilling fluid density is about 9 lb/gal to about 12 lb/gal.

Various preferred ranges for the drilling fluid composition are set out below.

Preferred Ranges for Different Materials

|  | (% BVOW) | Amount (% Barite/ Hydraulic Material)* | Starting Density (lb/gal) |
|---|---|---|---|
| Class F Fly Ash: Surfactants: |  |  |  |
| "HOWCO SUDS"/"HC-2" ® | 2/1 | 75/25 | 15 |
| "AQF-"2/"HC-2" | 4/2 | 85/15 | 15 |
| Class C Fly Ash: Surfactants: |  |  |  |
| "AQF-2"/"HC-2" | 2/1 | 0/100 | 13 |
| Silicalite (Compacted Powder or Liquid): Surfactants: |  |  |  |
| "AQF-2"/"HC-2" | 4/2 | 50/50 | 13 |
| SLAG: Surfactants: |  |  |  |
| "SIMULSOL" ®-10/"HC-2" | 4/2 | 0/100 | 15 |
| "AQF-2"/"HC-2" | 1/0.5 | 0/100 | 15 |

*Percent in an amount necessary for achieving a desired density of the unfoamed drilling fluid composition in the range from about 9 to about 17 lbs/gal Other fluid loss control additives, such as carboxymethylcellulose, starch, co-polymer of NNDMA & AMPS, poly anionic cellulose, and/or dispersants such as sulfonated styrene maleic anhydride and lignin based materials, can be utilized in the drilling fluid.

The drilling fluid composition provided herein is premixed using conventional rig equipment such as mud mixing pits, and is preferably foamed using a tee foam generator. The tee foam generator is comprised of a choke nozzle (part no. 439.00272), ceramic insert (part no. 643.0355) and T-body (425.80463), each of which is available from Halliburton Energy Services of Duncan, Okla. The tee foam generator introduces nitrogen, compressed air or other suitable gas into the drilling fluid composition.

The methods of using the foamable drilling fluid composition in deep water offshore drilling operations basically comprise the steps of drilling a wellbore; providing a foamable drilling fluid as described herein; foaming the drilling fluid; and circulating the foamed drilling fluid composition in the wellbore. The foamed fluid may be used in periodic sweeps of the wellbore as staged with conventional drilling fluids. Further, the circulating foamed drilling fluid may include the hydraulic material which either with activation or time will solidify the filter cake.

To further illustrate the present invention, and not by way of limitation, the following examples are provided.

EXAMPLE I

Dynamic fluid loss tests were performed using sweeps of the foamed drilling fluid composition of the present invention at a test temperature of 60° F. and a pressure of 120 psi. The recipes of the compositions tested and the test results are set out in TABLE I, below.

Each of the compositions included prehydrated bentonite (at a concentration of 30 lb/bbl bentonite in fresh water), sea water and barite, while some of the compositions included either blast furnace slag, fumed silica or fly ash (Class C). Various amounts of foaming surfactant, stabilizing surfactant and additional fluid loss additives were employed in the testing. The data indicates the grams of filtrate which were collected over time using a "METTLER" Balance.

Referring now to TABLE I, it is seen that optimum filtrate ranges are provided using various concentrations of hydraulic materials and surfactants.

TABLE I

Dynamic Fluid Loss Tests
(Test Temperature 60° F. - Pressure 120 psi)

| TEST NO. | I* | II* | III* | IV* | V* | VI* |
|---|---|---|---|---|---|---|
| Sea Water (bbl) | 1 | 1 | 0.5 | 0.5 | 0.5 | 0.5 |
| Barite %ª | 100 | 100 | 100 | 85 | 85 | 85 |
| Other Material %ª | 0 | 0 | 0 | Slag 15 | C Fly Ash 15 | Silicalite 15 |
| Unfoamed Density (lb/gal) | 15 | 10.5 | 15 | 15 | 15 | 15 |
| Foamer % BVOW |  |  |  |  |  |  |
| "CFA-S" | 4 | — | — | — | — | — |
| "AQF-2" | — | 0 | 4 | 4 | 2 | 4 |
| HC-2 Stabilizer % BVOW | 2 | 0 | 2 | 2 | 2 | 2 |
| Other fluid loss additive |  |  |  |  |  |  |
| "PAC-L" (ppb)ᵇ | 1 | 1 | — | 1 | 0.75 | 1 |
| "X-TEND" II (ppb)ᵇ | — | 0.2 | — | — | — | — |
| "HALAD*-4" (ppb) | — | — | — | — | 1.5 | — |

*Prehydrated Bentonite (bbl) - 30 lb bentonite in 1 bbl fresh water
ªPercent of barite and other hydraulic material is added in an amount necessary for achieving a desired density of the unfoamed drilling fluid composition in the range from about 9 to about 17 lbs/gal
ᵇ"PAC-L" and "X-TEND II" additives were obtained from Baroid Drilling Fluids, Houston, Texas Fluid Loss Rate at grams per minute

| Time (Minute) | TEST NO. | | | | | |
|---|---|---|---|---|---|---|
|  | I | II | III* | IV | V | VI** |
| 0.5 | 28.8 | — | 23 | 5.6 | — | — |
| 1 | 23 | 5.29 | 7.2 | 4.2 | 9.1 | 14.1 |
| 2 | 3.6 | 0.99 | 3.9 | — | 1.8 | 1.6 |
| 5 | 2.57 | 0.73 | 2.7 | 1.75 | 0.98 | 2.43 |
| 10 | 1.62 | 0.52 | 1.8 | 2.41 | 0.88 | 1.1 |
| 15 | 1.14 | — | 1.4 | — | 0.62 | 0.86 |
| 20 | 1.08 | 0.38 | 1.3 | — | 0.48 | 0.86 |
| 30 | 1.06 | 0.3 | 1.25 | 0.74 | 0.37 | 0.71 |
| 40 | 0.54 | 0.3 | 0.93 | 0.58 | 0.33 | 0.55 |
| 50 | 0.63 | 0.23 | 0.86 | 0.51 | 0.32 | 0.58 |
| 60 | 0.56 | 0.26 | 0.75 | 0.53 | 0.54 | 0.49 |
| 70 | 0.54 | 0.26 | 0.7 | 0.48 | 0.3 | 0.35 |
| 80 | 0.53 | 0.18 | 0.68 | 0.47 | 0.23 | 0.31 |
| 90 | 0.5 | 0.2 | 0.62 | 0.39 | 0.18 | 0.31 |

*Sea water was reduced to 0.5 bbl from 1 bbl
**50% active liquid Silicalite

EXAMPLE II

Foam stability and rheology tests were performed at room temperature, unless indicated otherwise, using various foam drilling fluid compositions containing hydraulic materials including either fly ash (Class C), blast furnace slag, compacted silicate or fly ash (Class F). The recipes of the compositions tested and the test results are set out in TABLES II, III, IV and V, below.

TABLE II

Class C Fly Ash

| Sample No. | Prehydrated Bentonite bbl | Sea Water bbl | Barite* % | Class C Fly Ash* % | Initial Density ppg | "AQF-2" % BVOW | "HC-2" % BVOW | Foamed Density ppg | Foam Stability |
|---|---|---|---|---|---|---|---|---|---|
| 1 | 1 | 1 | 0 | 100 | 13 | 4 | 2 | — | too thick to foam |
| 2 | 1 | 1 | 50 | 50 | 13 | 4 | 2 | 9.7 | thinner, stable |
| 3 | 1 | 1 | 85 | 15 | 13 | 4 | 2 | 10.1 | stable |
| 4 | 1 | 2 | 15 | 85 | 13 | 1 | 0.5 | 9.7 | viscous, stable |
| 5 | 1 | 2 | 0 | 100 | 13 | 2 | 1 | 9.7 | stable |

Rheology
(rpms - dial reading from a rotary viscometer)

| Sample No. | 600 | 300 | 200 | 100 | 6 | 3 |
|---|---|---|---|---|---|---|
| 1 | — | — | — | — | — | — |
| 2 | 112 | 92 | 81 | 66 | 28 | 25 |
| 3 | 80 | 62 | 50 | 35 | 12 | 11 |
| 4 | 186 | 141 | 128 | 117 | 59 | 56 |
| 5 | 110 | 94 | 88 | 79 | 34 | 31 |

*Percent of barite and other hydraulic material is added in an amount necessary for achieving a 13 lb/gal density of unfoamed drilling fluid.

TABLE III

SLAG

| Sample No. | Prehydrated Bentonite bbl | Sea Water bbl | Barite* % | Slag* % | Initial Density ppg | "AQF-2" % BVOW | "HC-2" % BVOW | Foamed Density ppg | Foamed Stability |
|---|---|---|---|---|---|---|---|---|---|
| 1 | 1 | 1 | 0 | 100 | 15 | 4 | 2 | 10.5 | too thick to foam |
| 2 | 1 | 1 | 0 | 100 | 13 | 4 | 2 | 9.8 | stable |
| 3 | 1 | 1 | 15 | 85 | 15 | 4 | 2 | 10.4 | stable |
| 4 | 1 | 1 | 50 | 50 | 15 | 4 | 2 | 10.4 | stable |
| 5 | 1 | 1 | 85 | 15 | 15 | 4 | 2 | 9.9 | stable |
| 6[a] | 1 | 0.5 | 85 | 15 | 15 | 4 | 2 | 9.7 | stable |

Rheology
(rpms - dial readings from a rotary viscometer)

| Sample No. | 600 | 300 | 200 | 100 | 6 | 3 |
|---|---|---|---|---|---|---|
| 1 | 175 | 161 | 148 | 123 | 48 | 35 |
| 2 | 82 | 70 | 67 | 63 | 32 | 23 |
| 3 | 93 | 74 | 68 | 62 | 48 | 35 |
| 4 | 78 | 56 | 41 | 34 | 27 | 25 |
| 5 | 60 | 38 | 30 | 24 | 21 | 19 |
| 6 | 113 | 74 | 62 | 49 | 33 | 32 |

*Percent of barite and other hydraulic material is added in an amount necessary for achieving a 13 lb/gal density of unfoamed drilling fluid
[a]1.0 "PAC-L" additive was added (grams/1600 cc volume)

TABLE IV

(Fumed Silica)

| Sample No. | Prehydrated Bentonite bbl | Sea Water bbl | Barite[a] % | Fumed Silica[a] % | Initial Density ppg | "AQF-2" % BVOW | "HC-2" % BVOW | Foamed Density ppg | Foamed Stability |
|---|---|---|---|---|---|---|---|---|---|
| 1 | 1 | 1 | 15 | 85 | 13 | 4 | 2 | — | too thick* to foam |
| 2 | 1 | 1 | 50 | 50 | 13 | 4 | 2 | 10 | stable* |
| 3 | 1 | 0.5 | 85 | 15 | 15 | 4 | 2 | 10.5 | stable |
| 4 | 1 | 1.5 | 75 | 25 | 15 | 2 | 1 | 9.8 | stable |
| 5 | 1 | 0.5 | 85 | 15 (active)** | 15 | 4 | 2 | 10 | stable |

TABLE IV-continued

| | Rheology (rpms - dial readings from a rotary viscometer) | | | | | |
|---|---|---|---|---|---|---|
| Sample No. | 600 | 300 | 200 | 100 | 6 | 3 |
| 1 | — | — | — | — | — | — |
| 2 | 126 | 81 | 67 | 50 | 22 | 19 |
| 3[1] | 190 | 126 | 102 | 71 | 30 | 29 |
| 4[2] | 144 | 96 | 78 | 57 | 31 | 30 |
| 5[3] | 138 | 86 | 69 | 47 | 16 | 15 |

*15 g "Supericizer"
**Liquid Suspension of fumed silica (50% active)
[a]Percent of barite and other hydraulic material is added in an amount necessary for achieving a 13 lb/gal density of the unfoamed drilling fluid
[1]0.75 g "PAC-L", 1.5 g "HALAD-344" added (grams/1600 cc volume)
[2]0.5 g "PAC-L", 1 g "SSMA" added (grams/1600 cc volume)
[3]1 g "PAC-L" additive (grams/1600 cc volume)

TABLE V

Class F Fly Ash

| Sample No. | Prehydrated Bentonite bbl | Sea Water bbl | Barite* % | Class F Fly Ash* % | Initial Density ppg | "AQF-2" % BVOW | "HC-2" % BVOW | Foamed Density ppg | Foam Stability |
|---|---|---|---|---|---|---|---|---|---|
| 1 | 1 | 1 | 85 | 15 | 15 | 2 | 1 | 10 | not stable |
| 2 | 1 | 1 | 85 | 15 | 15 | 4 | 2 | 10.5 | stable |
| 3 | 1 | 1 | 75 | 25 | 15 | (Howco Suds)2 | 1 | 9.6 | stable |

| | Rheology (rpms - dial readings from a rotary viscometer) | | | | | | |
|---|---|---|---|---|---|---|---|
| Sample No. | 600 | 300 | 200 | 100 | 6 | 3 | Other Additives grams/1600 cc volume |
| 1 | 300+ | 187 | 137 | 79 | 10 | 7 | 4 g "LAP-1"[1], 0.7 g "SSMA"[2] |
| 2 | 192 | 139 | 105 | 70 | 53 | 45 | 1 g "PAC-L" |
| 3 | 225 | 147 | 116 | 78 | 21 | 19 | 4 g "LAP-1", 1 g "LP-55" |

*Percent of barite and other hydraulic material is added in an amount necessary for achieving a 13 lb/gal density of the unfoamed drilling fluid
[1]"LAP-1" is an additive obtained from Halliburton Energy Services, Duncan, Oklahoma
[2]"SSMA" is sulfonated styrene maleic anhydride available from Alco, a division of National Starch and Chemical Company in Bridgewater, New Jersey Referring now to TABLES II–V, it is seen that foam stabilities are provided using various hydraulic materials.

The present invention of utilizing foamed drilling fluid has a number of benefits, such as increasing the drilling fluid viscosity for cleaning the wellbore and carrying solids, imparting fluid loss control to the drilling fluid, adding volume to the original fluid, imparting gel strength to stabilize the wellbore and minimize washed out regions, and allowing easy adjustment of the drilling fluid density.

Thus, the present invention is well adapted to attain the ends and advantages mentioned as well as those which are inherent therein. While numerous changes may be made by those skilled in the art, such changes are encompassed within the spirit of this invention as defined by the appended claims.

What is claimed is:

1. A method of performing drilling operations comprising the steps of:
    drilling a wellbore;
    providing a foamable drilling fluid comprising a prehydrated clay, water, a foaming surfactant present in an amount sufficient to foam said drilling fluid, a stabilizing surfactant present in an amount sufficient to reduce breakdown of said drilling fluid when foamed, and a hydraulic material;
    foaming said drilling fluid; and
    circulating said foamed drilling fluid in said wellbore.

2. The method of claim 1 wherein said clay is selected from bentonite, attapulgite, or sepiolite.

3. The method of claim 1 wherein said water is selected from fresh water, sea water or brine.

4. The method of claim 1 wherein said foaming surfactant is selected from α-olefinsulfonates, alkylpolyglycosides, alcohol sulfates, or salts of ethoxylated alcohol sulfates.

5. The method of claim 1 wherein said foaming surfactant is present in said drilling fluid in an amount in the range from about 1% to about 4% by volume of said water.

6. The method of claim 1 wherein said stabilizing surfactant comprises a cocoamine betaine.

7. The method of claim 1 wherein said stabilizing surfactant is present in said drilling fluid in an amount in the range from about 0.5% to about 2% by volume of said water.

8. The method of claim 1 wherein said drilling fluid comprises barite.

9. The method of claim 8 wherein said barite and said hydraulic material are collectively present in said drilling fluid in an amount necessary for providing said drilling fluid with an unfoamed density in the range from about 9 to about 17 pounds per gallon.

10. The method of claim 1 wherein said hydraulic material is selected from Portland cement, siliceous material, blast furnace slag, or pozzolans.

11. The method of claim 1 wherein the density of said foamed drilling fluid is in the range from about 6 to about 13 pounds per gallon.

12. The method of claim 1 wherein said clay is selected from bentonite, attapulgite, or sepiolite; said water is selected from fresh water, sea water, or brine; said foaming surfactant is present in said drilling fluid in an amount in the range from about 1% to about 4% by volume of said water and is selected from α-olefinsulfonates, alkylpolyglycosides, alcohol sulfates, or salts of ethoxylated alcohol sulfates; said stabilizing surfactant is present in said drilling fluid in an amount in the range from about 0.5% to about 2% by volume of said water and comprises a cocoamine betaine; said hydraulic material is selected from Portland cement, siliceous material, blast furnace slag, or pozzolans; and wherein the density of said foamed drilling fluid is in the range from about 6 to about 13 pounds per gallon.

13. A method of performing drilling operations comprising the steps of:

drilling a wellbore;

providing a foamable drilling fluid comprising a prehydrated clay, water selected from sea water or brine, a foaming surfactant present in an amount sufficient to foam said drilling fluid, a stabilizing surfactant present in an amount sufficient to reduce breakdown of said drilling fluid when foamed;

foaming said drilling fluid; and circulating said foamed drilling fluid in said wellbore.

14. The method of claim 13 wherein said clay is selected from bentonite, attapulgite, or sepiolite.

15. The method claim 13 wherein said foaming surfactant is selected from α-olefinsulfonates, alkylpolyglycosides, alcohol sulfates, or salts of ethoxylated alcohol sulfates.

16. The method of claim 13 wherein said foaming surfactant is present in said drilling fluid in an amount in the range from about 1% to about 4% by volume of said water.

17. The method of claim 13 wherein said stabilizing surfactant comprises a cocoamine betaine.

18. The method of claim 13 wherein said stabilizing surfactant is present in said drilling fluid in an amount in the range from about 0.5% to about 2% by volume of said water.

19. The method of claim 13 wherein the density of said foamed drilling fluid is in the range from about 6 to about 13 pounds per gallon.

20. The method of claim 13 wherein said clay is selected from bentonite, attapulgite, or sepiolite; said foaming surfactant is present in said drilling fluid in an amount in the range from about 1% to about 4% by volume of said water and is selected from α-olefinsulfonates, alkylpolyglycosides, alcohol sulfates, or salts of ethoxylated alcohol sulfates; said stabilizing surfactant is present in said drilling fluid in an amount in the range from about 0.5% to about 2% by volume of said water and comprises a cocoamine betaine; and wherein the density of the foamed drilling fluid composition is in the range from about 6 to about 13 pounds per gallon.

21. The method of claim 13 further comprising a hydraulic material selected from Portland cement, siliceous material, blast furnace slag, or pozzolans.

22. The method of claim 13 wherein said drilling fluid comprises barite.

23. The method of claim 13 wherein said drilling fluid comprises a hydraulic material and barite wherein said hydraulic material and barite are collectively present in said drilling fluid in an amount necessary for providing said drilling fluid with an unfoamed density in the range from about 9 to about 17 pounds per gallon.

24. A method of performing drilling operations comprising the steps of:

drilling a wellbore;

providing a foamable drilling fluid comprising a prehydrated clay, water, a foaming surfactant present in an amount sufficient to foam said drilling fluid, and a stabilizing surfactant present in an amount sufficient to reduce breakdown of said drilling fluid when foamed wherein said stabilizing surfactant comprises a cocoamine betaine;

foaming said drilling fluid; and circulating said foamed drilling fluid in said wellbore.

25. The method of claim 24 wherein said clay is selected from bentonite, attapulgite, or sepiolite.

26. The method of claim 24 wherein said foaming surfactant is selected from α-olefinsulfonates, alkylpolyglycosides, alcohol sulfates, or salts of ethoxylated alcohol sulfates.

27. The method of claim 24 wherein said foaming surfactant is present in said drilling fluid in an amount in the range from about 1% to about 4% by volume of said water.

28. The method of claim 24 wherein said stabilizing surfactant is present in said drilling fluid in an amount in the range from about 0.5% to about 2% by volume of said water.

29. The method of claim 24 wherein the density of said foamed drilling fluid is in the range from about 6 to about 13 pounds per gallon.

30. The method of claim 24 wherein said clay is selected from bentonite, attapulgite, or sepiolite; said foaming surfactant is present in said drilling fluid in an amount in the range from about 1% to about 4% by volume of said water and is selected from α-olefinsulfonates, alkylpolyglycosides, alcohol sulfates, or salts of ethoxylated alcohol sulfates; said stabilizing surfactant is present in said drilling fluid in an amount in the range from about 0.5% to about 2% by volume of said water; and wherein the density of said foamed drilling fluid is in the range from about 6 to about 13 pounds per gallon.

31. A method of performing offshore drilling operations comprising the steps of:

drilling a wellbore;

circulating a foamed drilling fluid in the wellbore; and circulating the foamed drilling fluid into the offshore water at the sea floor.

32. The method of claim 31 wherein the drilling operations are at depths in excess of 2000 feet of water.

33. The method of claim 31 wherein the foamed drilling fluid comprises:

a prehydrated clay;

water;

a foaming surfactant present in an amount sufficient to foam the drilling fluid;

a stabilizing surfactant present in an amount sufficient to reduce breakdown of said drilling fluid when foamed; and a gas present in an amount sufficient to foam said drilling fluid.

34. The method of claim 33 wherein the drilling fluid further comprises a hydraulic material.

\* \* \* \* \*